March 31, 1931.  W. KUTURLASH  1,799,050
AUTOMOBILE TOP
Filed May 3, 1930  3 Sheets-Sheet 1
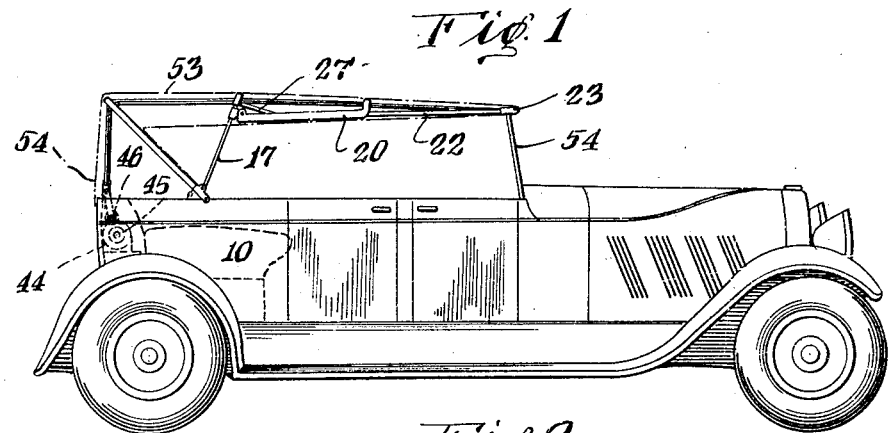
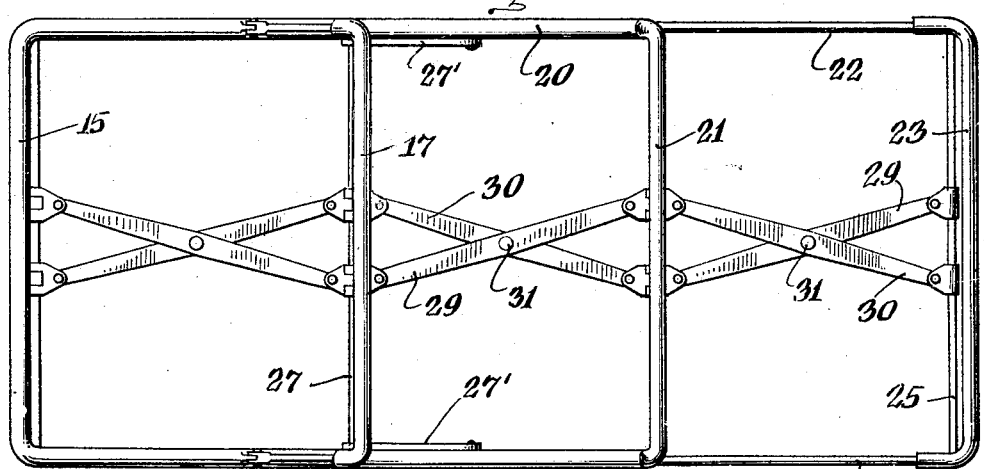
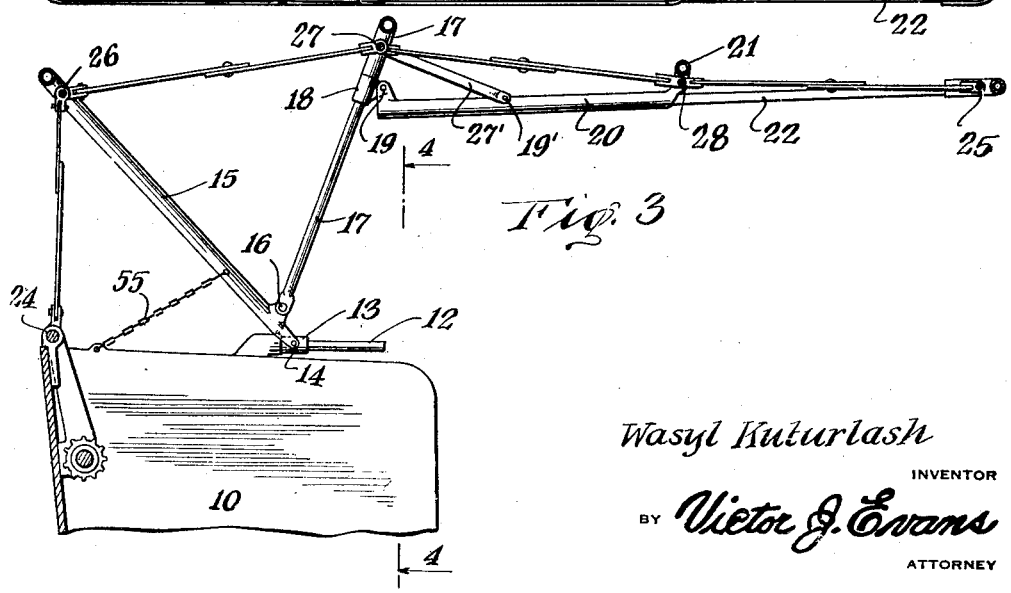
Wasyl Kuturlash
INVENTOR
BY Victor J. Evans
ATTORNEY Wasyl Kuturlash
INVENTOR BY Victor J. Evans
ATTORNEY March 31, 1931.  W. KUTURLASH  1,799,050
AUTOMOBILE TOP
Filed May 3, 1930   3 Sheets-Sheet 3

Wasyl Kuturlash
INVENTOR

BY Victor J. Evans
ATTORNEY

Patented Mar. 31, 1931

1,799,050

UNITED STATES PATENT OFFICE

WASYL KUTURLASH, OF BROOKLYN, NEW YORK

AUTOMOBILE TOP

Application filed May 3, 1930. Serial No. 449,569.

This invention relates to foldable vehicle tops in which the structure thereof is movable between a closed and lowered position, at the rear end of the vehicle, and a raised and extended position above the body of the vehicle.

As automobile tops, particularly those of large dimensions, such as are required for touring cars, necessarily include a number of sections, one of the objects of this invention is the provision of a top in which compound sections, while partly movable in one direction, say rearwardly, are at the same time partly movable in another direction, such as forwardly, so that the respective sections, while movable within restricted limits, may also fold more compactly and occupy less space in the folded position.

Another object is to provide an organization in which the constituent elements are so coordinated structurally and functionally as to assure improved results with material which may be manufactured at a reasonable cost.

A further object of the invention is the provision of a foldable top in which longitudinally expansible and contractible levers, while centrally pivoted and terminally movable outwardly or laterally, are provided with improved terminal bearing, so as to facilitate the expanding and contracting operations.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Fig. 1 is a lateral elevational view of my improved foldable vehicle top shown in position on an automobile.

Fig. 2 is an enlarged plan view of the top.

Fig. 3 is a longitudinal sectional view taken centrally of Fig. 2.

Figure 4:
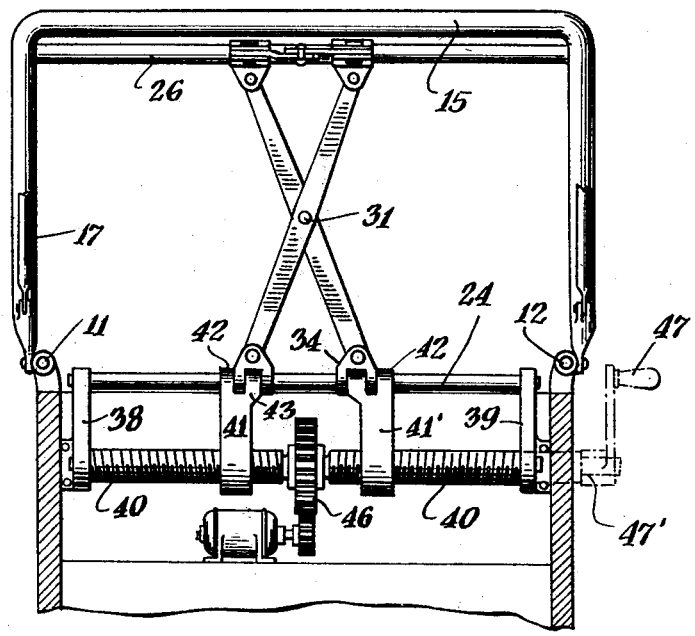
Fig. 4 is a vertical section taken on the line 4—4 of Fig. 3.
Figure 5:
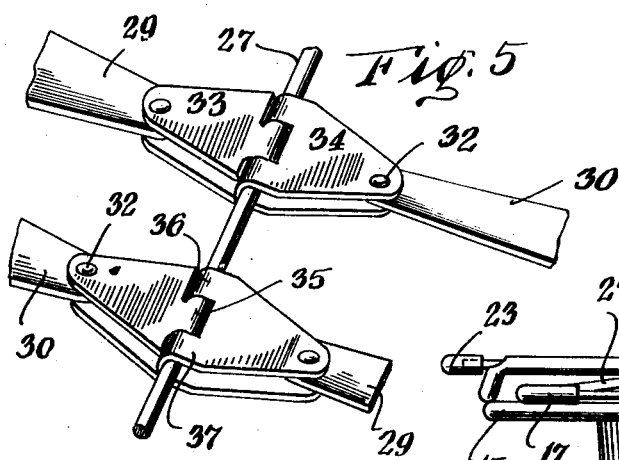
Fig. 5 is a fragmentary perspective showing a toggle joint.
Figure 6:
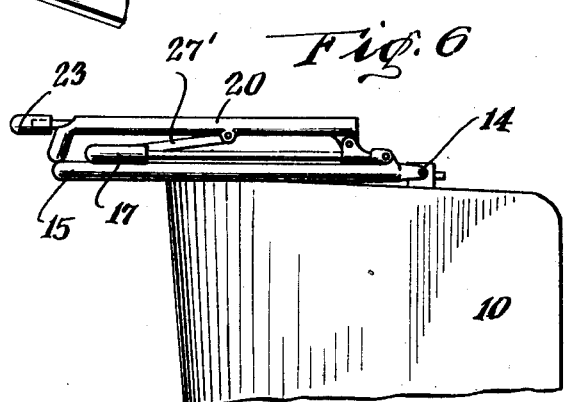
Fig. 6 is a fragmentary elevational view of a vehicle body on which the framework of the top is shown in folded condition.
Figure 8:
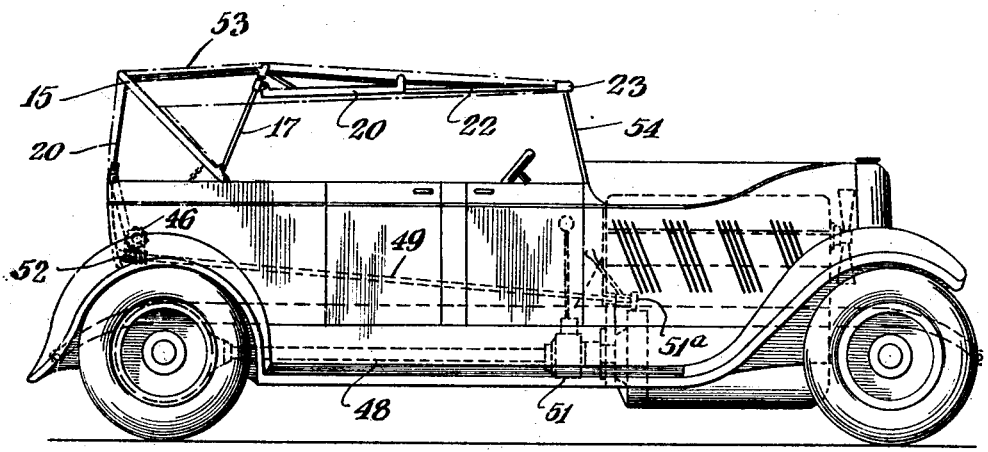
Fig. 8 is a lateral elevational view of an automobile in which the operating mechanism for the foldable top is diagrammatically shown.
Figure 9:
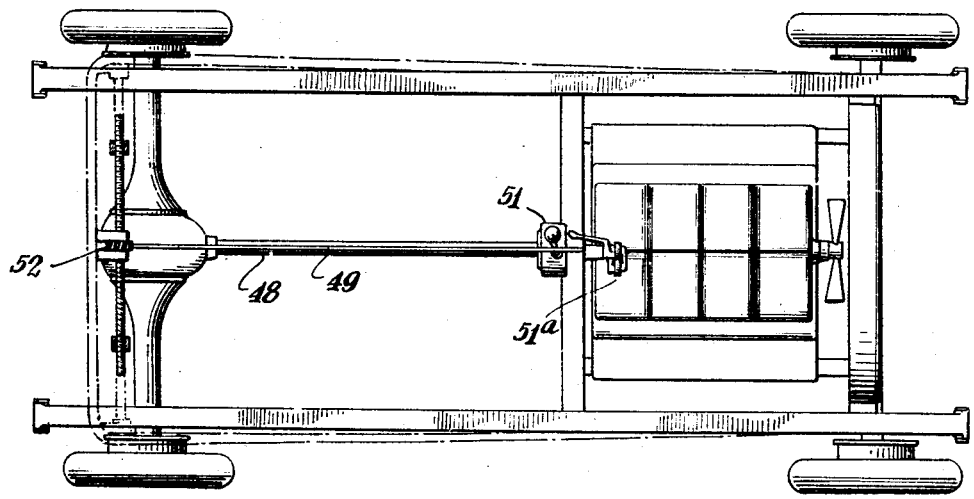
Fig. 9 is a plan view of the chassis of a car in which part of the operating mechanism is shown.
Figure 7:
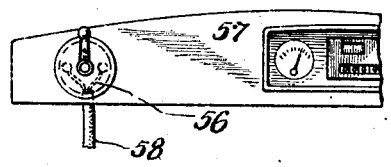
Fig. 7 is a fragmentary view of an instrument board.

Referring particularly to the drawings by reference characters, the numeral 10 designates the body of an automobile to the top edges of the rear part of which a pair of rods 11, 12 is attached. Each of these rods has slidably mounted thereon a ring or keeper 13, while each of the latter has rigid therewith a pivot pin 14. Pivoted on the pins 14 are the terminals of a U-shaped brace 15, and while each of these terminals carries also a pivot pin 16, there are mounted on the latter the terminals of another brace 17.

The legs of this brace 17 are of reduced diameter and have slidably mounted thereon like rings or keepers 18, each of which carries a pivot pin 19, and while these latter pins have mounted thereon the respective hollow terminals 20 of a U-shaped frame member 21, said member has slidably mounted in its hollow legs the reduced legs 22 of a front frame member 23. While the body 10 carries thereon a rear rod 24, and the member 23 a front rod 25, the respective braces carry rods 26 and 27, and the rear frame member a rod 28. Pivotally mounted at their opposite ends on the rod 27, and on the pins 19′ on the terminals 20, is a pair of links 27′.

The transversely disposed rods are so positioned, relative to their adjacent brace or frame members, as to insure free sliding movement thereon of the terminals of expansible and contractible toggle members which, terminally mounted at their respective rear and front ends on the rods 24 and 25, form a lazy-tong unit. While this unit includes a number of like toggles, a pair of levers 29 and 30 of each of the latter are pivoted at 31, and while the respective terminals of the arms of the levers, which are provided with apertures, receive identical pins, each designated 32, a pair of plates 33 and 34 carry in their terminals, which are also provided with apertures, the said pins. Each plate 33 is formed with a central barrel or knuckle 35, and each plate 34 with mating knuckles 36, 37. While the plates 33, 34 are slidably movable and hingedly swingable on the rods, as at 27, the terminals of the levers 29 and 30 are pivotally movable on the pins 32.

The body 10 has fixed thereto a pair of brackets 38, 39, which, carrying the rod 24, also carry the oppositely threaded terminals of a revolvable shaft 40. This shaft threadedly carries thereon a pair of arms 41, 41', and since the terminal knuckles 42 and 43 of these arms, which are slidable on the rod 24, engage between knuckles 36, 37 of plates 34 on the rear toggles of the tong unit, it follows that on revolution of the terminals 40 of the shaft the toggles are expanded laterally and contracted longitudinally to fold the framework of the top, or the reverse. Inward movement of the arms 41, 41', of course, contracts the toggles laterally to unfold or extend the framework.

The flexible cover 53 of the foldable frame is attached at its front end to the front part of the frame 23, and while secured at its rear end, as at 54, is also attached to the top of each of the brace and frame members, 15, 17, 21, so that in the folded position of the framework the cover is folded between the said members. While the front end of the framework, as at 23, rests on the windshield 54, an additional strap or fastening means, not shown, may be utilized. In order to limit the forward sliding movement of the keepers 13, the brace 15 may have, terminally attached thereto, and to the body 10, a flexible brace 55.

An electric motor 44 has on the shaft thereof a worm 45, which meshes with a gear 46 on the shaft 40 to revolve the latter, but the shaft 40 may also be revolved manually as by a removable crank handle 47, there being an angular terminal 47' on one end of the revolvable shafts to receive the socket of the handle. A control switch 56 is provided on the instrument board 57, in the circuit wiring 58 of the motor.

As the shaft may also be revolved by the drive shaft 48 of an automobile, I have shown a shaft 49 which, provided with gearing 50 to engage in mesh with gearing on the said shaft 48, preferably in front of the usual transmission 51, is also provided with a worm gear 52 to connect with the gear 46. The hereinbefore described construction admits of considerable modification without departing from the invention; therefore, I do not wish to be limited to the precise arrangements shown and described, which are as aforesaid, by way of illustration merely. In other words, the scope of protection contemplated is to be taken solely from the appended claims, interpreted as broadly as is consistent with the prior art.

What is claimed as new is:

1. A foldable top for vehicles comprising in combination with a vehicle having a body, a rearwardly swingable rear brace terminally pivoted on said body, a front brace terminally pivoted on said first brace, a rear frame member carried by said latter brace and swingable rearwardly thereon, a front frame member telescopically insertable in said first frame member, transversely disposed rods carried by said braces and by said frame members, a rear transversely disposed rod carried by said body, longitudinally contractible mutually terminally interconnected arms carried by said rods, the terminals of said arms being slidable on said rods, a revolvable shaft having reversely threaded terminals adjacent said rear rod, and a pair of arms threadedly mounted at one of their respective ends on said terminals and slidable at their opposite ends on said rear rod, said latter ends interconnected with the rearmost ends of said first arms, whereby on revolution of said shaft said threadedly mounted arms are slidably movable on said rear rod for contracting said first arms to fold said frames and said braces rearwardly.

2. A foldable top for vehicles comprising in combination with a vehicle having a body, longitudinally disposed rods carried by said body, pivots carried by said rods, a rearwardly swingable brace terminally mounted on said pivots, which latter are slidable on said rods to facilitate the rearward swinging movement, a second brace forwardly pivotally mounted on said first brace, a rear frame member carried by said latter brace and swingable rearwardly thereon, said member terminally slidable on said latter brace to facilitate the swinging movement, a front frame member telescopically insertable in said first frame member, transversely disposed rods carried by said braces, transversely disposed rods carried by said frame members, a rear transversely disposed rod carried by said body, longitudinally contractible mutually terminally interconnected arms carried by said rods, the terminals of said arms being slidable on said rods, a revolvable shaft mounted parallel with and adjacent said rear rod, said shaft having reversely threaded terminals, and a pair of arms threadedly mounted at one of their respective ends on said latter terminals and slidable at their opposite ends on said rear rod, said latter ends interconnected with the rearmost ends of said first arms, whereby on revolution of said shaft said threadedly mounted arms are slidably movable on said rear rod for also sliding said first arms to contract said first arm for folding said frames and said braces rearwardly.

3. A foldable top for a vehicle comprising in combination with a vehicle body, longitudinally disposed rods carried by said body, slidable pivots carried by said rods, a rearwardly swingable brace terminally mounted on said pivots, the sliding movement of the latter adapted to facilitate the rearward swinging movement, pivots carried on said brace adjacent its terminal, a second brace mounted on said latter pivots and also swingable rearwardly, keepers slidably mounted on said second brace, a rearwardly swingable frame member terminally pivoted on said keepers, sliding movement of said keepers adapted to facilitate the rearward swinging of said frame, a transversely disposed rod carried by said first brace a transversely disposed rod carried by said second brace, pivots rigid with said frame, links terminally pivotally mounted on said latter pivots and on said latter rod for swingably supporting said frame, a second frame member having legs telescopically insertable in said first frame member, a transversely disposed rod carried by each of said frame members a rear transversely disposed rod carried by said body, longitudinally contractible centrally pivoted pairs of arms disposed between the respective rods and terminally slidable on said rods, a revolvable shaft mounted parallel with and adjacent said rear rod, said shaft having reversely threaded terminals and a pair of arms threadedly mounted at one of their respective ends on said terminals and slidable at their opposite ends on said rear rod, said latter ends interconnected with the rearmost end of said first arms, whereby on revolution of said shaft said threadedly mounted arms are effective to slide said first arms for contracting the latter to swing said frames and said braces rearwardly.

4. In combination with a vehicle body, a top including a rear brace supported at its lower end on the body, a front brace supported on said first brace, rear and front frame members carried by said latter brace, a cover carried by said braces and frame members, a rear rod carried by said body, a front rod carried by said front frame members, rods carried by said braces and by said rear frame member, and rigidifying arms mounted on said rods, the terminals of said arms being mounted on said rear and front rods.

5. A toggle joint comprising in combination with a pair of arms, said arms having terminal apertures therein, a pair of plates folded on themselves and having mutually engaging knuckles, a rod loosely embraced by said knuckles, said plates loosely embracing said arms and having also terminal apertures therein, and pivot pins disposed in said apertures, said arms being pivotally movable on said pins, and said knuckles being slidable on said rod.

In testimony whereof I hereby affix my signature.

WASYL KUTURLASH.